(12) United States Patent
Yamaguchi et al.

(10) Patent No.: US 10,679,496 B2
(45) Date of Patent: Jun. 9, 2020

(54) INFORMATION PROVIDING APPARATUS

(71) Applicant: Ricoh Company, Ltd., Tokyo (JP)

(72) Inventors: Hiroshi Yamaguchi, Kanagawa (JP); Kenichiroh Saisho, Tokyo (JP); Masato Kusanagi, Kanagawa (JP); Yuuki Suzuki, Kanagawa (JP); Keita Katagiri, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/057,298

(22) Filed: Aug. 7, 2018

(65) Prior Publication Data
US 2018/0350236 A1 Dec. 6, 2018

Related U.S. Application Data

(63) Continuation of application No. PCT/JP2017/004409, filed on Feb. 7, 2017.

(30) Foreign Application Priority Data

Feb. 10, 2016 (JP) .................................. 2016-023530

(51) Int. Cl.
*G08G 1/0962* (2006.01)
*G08G 1/04* (2006.01)
(Continued)

(52) U.S. Cl.
CPC ......... *G08G 1/09626* (2013.01); *B60K 35/00* (2013.01); *B60R 16/02* (2013.01);
(Continued)

(58) Field of Classification Search
CPC ....................................................... G06F 3/016
See application file for complete search history.

(56) References Cited

U.S. PATENT DOCUMENTS 7,131,060 B1 * 10/2006 Azuma ................... G06T 11/60
715/260
7,616,364 B2 11/2009 Saisho et al.
(Continued)

FOREIGN PATENT DOCUMENTS

EP          2945001 A1    11/2015
JP       2009-248812      10/2009
(Continued)

OTHER PUBLICATIONS

International Search Report dated Mar. 7, 2017 in PCT/JP2017/004409 filed on Feb. 7, 2017 (with English translation).
(Continued)

*Primary Examiner* — Nabil H Syed
*Assistant Examiner* — Cal J Eustaquio
(74) *Attorney, Agent, or Firm* — Xsensus LLP

(57) ABSTRACT

An information providing apparatus installed in a moving body includes one or more processors, and a memory, the memory storing instructions, which when executed by the one or more processors, cause the one or more processors to display, by a display unit, an information providing image as a virtual image, and control the display unit to change a display position of the information providing image. The information providing image includes a first information providing image and a second information providing image, and the display unit is controlled such that a changing rate of a display position of the first information providing image differs from that of a display position of the second information providing image, and the changing rates of the display positions of the first and the second information providing images both increase as a moving velocity of the moving body increases.

20 Claims, 10 Drawing Sheets

(51) Int. Cl.
  *B60K 35/00* (2006.01)
  *G08G 1/054* (2006.01)
  *G02B 27/01* (2006.01)
  *B60R 16/02* (2006.01)

(52) U.S. Cl.
  CPC .............. *G02B 27/01* (2013.01); *G08G 1/04* (2013.01); *G08G 1/054* (2013.01); *G08G 1/0962* (2013.01); *B60K 2370/149* (2019.05); *B60K 2370/1529* (2019.05); *B60K 2370/16* (2019.05); *B60K 2370/167* (2019.05); *B60K 2370/186* (2019.05); *B60K 2370/1868* (2019.05); *B60K 2370/193* (2019.05); *B60K 2370/334* (2019.05); *B60K 2370/52* (2019.05); *G02B 2027/0183* (2013.01); *G02B 2027/0187* (2013.01)

(56) References Cited

U.S. PATENT DOCUMENTS

| | | | |
|---|---|---|---|
| 7,672,032 | B2 | 3/2010 | Hayashi et al. |
| 7,688,491 | B2 | 3/2010 | Saisho et al. |
| 7,817,177 | B2 | 10/2010 | Hayashi et al. |
| 7,876,486 | B2 | 1/2011 | Saisho et al. |
| 8,045,248 | B2 | 10/2011 | Watanabe et al. |
| 8,059,149 | B2 | 11/2011 | Saisho et al. |
| 8,213,067 | B2 | 7/2012 | Saisho |
| 8,368,736 | B2 | 2/2013 | Saisho et al. |
| 8,531,766 | B2 | 9/2013 | Tokita et al. |
| 8,559,053 | B2 | 10/2013 | Saisho et al. |
| 8,848,013 | B2 | 9/2014 | Saisho et al. |
| 8,876,294 | B2 | 11/2014 | Saisho et al. |
| 8,884,975 | B2 | 11/2014 | Satoh et al. |
| 9,158,124 | B2 | 10/2015 | Saisho et al. |
| RE45,918 | E | 3/2016 | Saisho et al. |
| 9,686,480 | B2 | 6/2017 | Kusanagi |
| 9,798,140 | B2 | 10/2017 | Inamoto et al. |
| 2006/0022808 | A1 | 2/2006 | Ito et al. |
| 2012/0249589 | A1 | 10/2012 | Gassner et al. |
| 2015/0362734 | A1* | 12/2015 | Moser ................ G03H 1/0248 359/3 |
| 2016/0052394 | A1 | 2/2016 | Yamada |
| 2016/0170487 | A1 | 6/2016 | Saisho |
| 2016/0313562 | A1* | 10/2016 | Saisho .............. G02B 27/0179 |
| 2016/0334637 | A1 | 11/2016 | Saisho et al. |

FOREIGN PATENT DOCUMENTS

| | | |
|---|---|---|
| JP | 2010-175411 | 8/2010 |
| JP | 2011-157066 | 8/2011 |
| JP | 2011-218891 | 11/2011 |
| JP | 2012-168542 | 9/2012 |
| JP | 2012-252347 | 12/2012 |
| JP | 2013-032087 | 2/2013 |
| JP | 2013-061554 | 4/2013 |
| JP | 2013-257574 | 12/2013 |
| JP | 2014-115670 | 6/2014 |
| JP | 2014-139655 | 7/2014 |
| JP | 2014-139656 | 7/2014 |
| JP | 2014-139657 | 7/2014 |
| JP | 2015-049266 | 3/2015 |
| JP | 2015-092346 | 5/2015 |
| JP | 2015-108838 | 6/2015 |
| JP | 2015-138084 | 7/2015 |
| JP | 2015-148664 | 8/2015 |
| JP | 2015-200770 | 11/2015 |
| JP | 2015-232692 | 12/2015 |
| JP | 2016-045705 | 4/2016 |
| JP | 2016-107945 | 6/2016 |

OTHER PUBLICATIONS

Written Opinion dated Mar. 7, 2017 in PCT/JP2017/004409 filed on Feb. 7, 2017.

\* cited by examiner

INFORMATION PROVIDING APPARATUS

CROSS-REFERENCE TO RELATED APPLICATIONS

The present application is a continuation application of International Application No. PCT/JP2017/004409, filed on Feb. 7, 2017, which claims priority to Japanese Patent Application No. 2016-023530 filed on Feb. 10, 2016. The contents of these applications are incorporated herein by reference in their entirety.

BACKGROUND OF THE INVENTION

1. Field of the Invention

The disclosures discussed herein relate to an information providing apparatus.

2. Description of the Related Art

A head-up display (HUD) device or the like is known in the art as an information providing apparatus for displaying images to provide information to occupants of moving bodies, such as vehicles, ships, aircraft, industrial robots, and the like that carry occupants such as drivers.

Japanese Unexamined Patent Publication No. 2011-218891 discloses an information providing apparatus having a HUD device, which is configured to project image light reflected by a mirror onto a windshield of a vehicle to display an image to be superimposed on a viewing position (e.g., a road surface) in front of a driver, where the driver visually perceives the displayed image via a windshield. This information providing apparatus is configured to perform control of the HUD device to display a high priority emergency information image or the like at a position substantially superimposed on a reference visual line of a driver by changing a mirror angle of the HUD device, and subsequently to change the display position downward from the reference visual line.

In such an information providing apparatus, when an image light projection unit (e.g., a HUD device) displays an information providing image (i.e., information to be provided to occupants such as a drivers of moving bodies and passengers such as non-drivers of moving bodies) in a predetermined display area, in which objects around the moving body are visually perceived by the occupants or passengers, the display position of the information providing image may be changed for a predetermined purpose. For example, the display position of the information providing image may be changed in order to prevent the information providing image from obstructing an occupant's field of vision, or the display position may be changed in order for an occupant to easily perceive the information providing image. In such cases, it is often preferable that the occupant will not notice such a change of the display position of the information providing image. The change of the display position of the information providing image becomes less noticeable to the occupant as a changing rate of the display position becomes lower. However, when the changing rate is too slow, the time required to achieve the purpose (i.e., changing of the display position) increases.

RELATED ART DOCUMENT

Patent Document

[Patent Document 1] Japanese Unexamined Patent Publication No. 2011-218891

SUMMARY OF THE INVENTION

According to an aspect of the disclosure, an information providing apparatus installed in a moving body is provided. The information providing apparatus includes
  one or more processors; and
  a memory, the memory storing instructions, which when executed by the one or more processors, cause the one or more processors to:
    display, by a display unit, an information providing image to be provided as a virtual image; and
    control the display unit so as to change a display position of the information providing image, wherein
    the information providing image includes two information providing images to be provided as a first information providing image and a second information providing image, and wherein to control the display unit, the instructions further cause the one or more processors to:
    control the display unit such that a changing rate of a display position of the first information providing image differs from a changing rate of a display position of the second information providing image, and such that the changing rate of the display position of the first information providing image and the changing rate of the display position of the second information providing image both increase as a moving velocity of the moving body increases.

BRIEF DESCRIPTION OF THE DRAWINGS

Other objects and further features of embodiments will be apparent from the following detailed description when read in conjunction with the accompanying drawings, in which.

DESCRIPTION OF THE EMBODIMENTS

The following illustrates an embodiment of the present invention that is applied to a driver information providing system including an automotive head-up display (HUD) device as an information providing apparatus.

Figure 1:
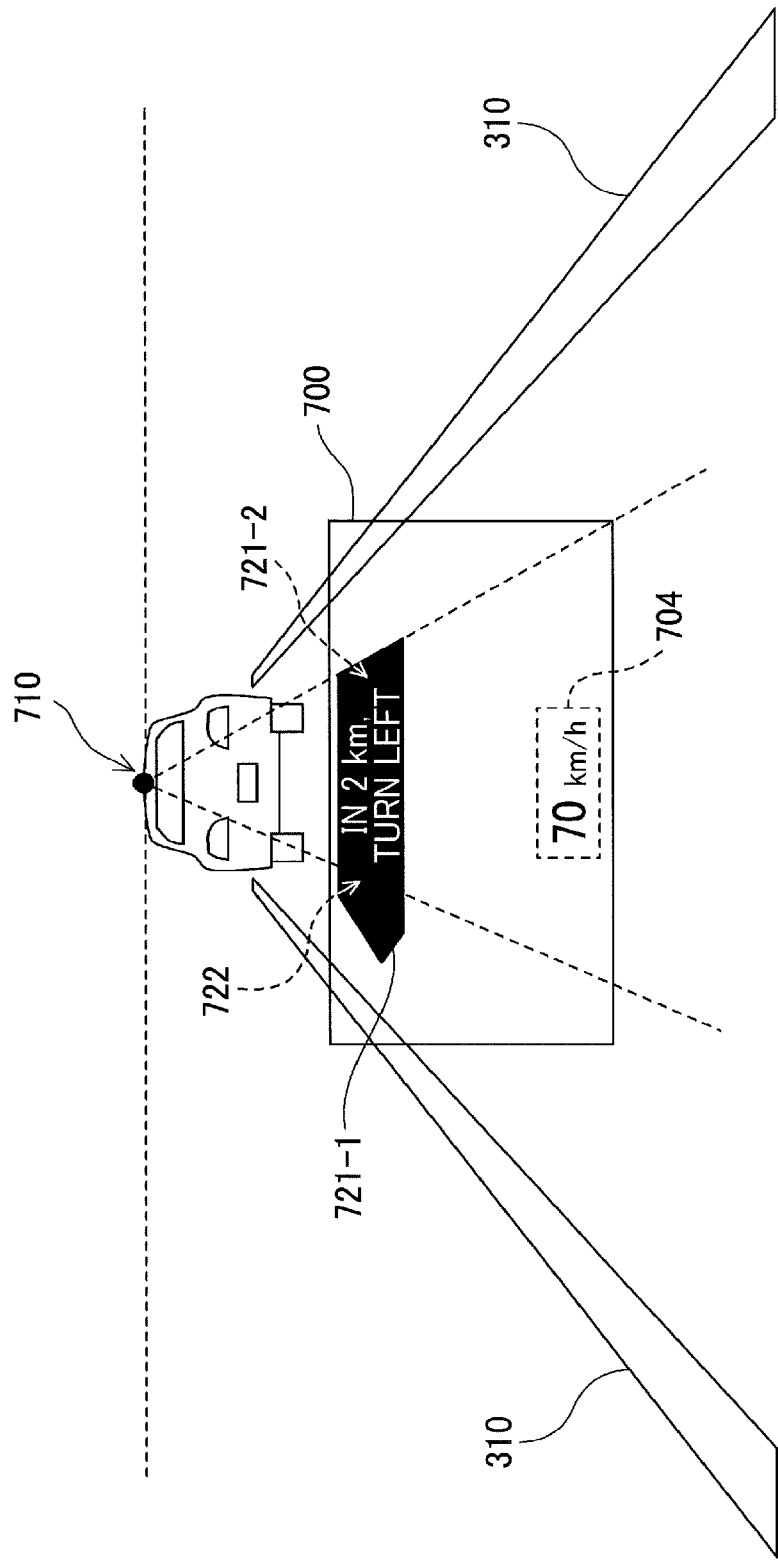
FIG. 1 is a diagram illustrating an example of a virtual image superimposed on a landscape in front of a vehicle displayed in a display area, which is viewed from a driver through a windshield, according to an embodiment.

FIG. 1 is a diagram illustrating an example of a virtual image I superimposed on a landscape in front of a reference vehicle 301 displayed in a display area 700, which is viewed from a driver 300 (an occupant) through a windshield 302.

Figure 2:
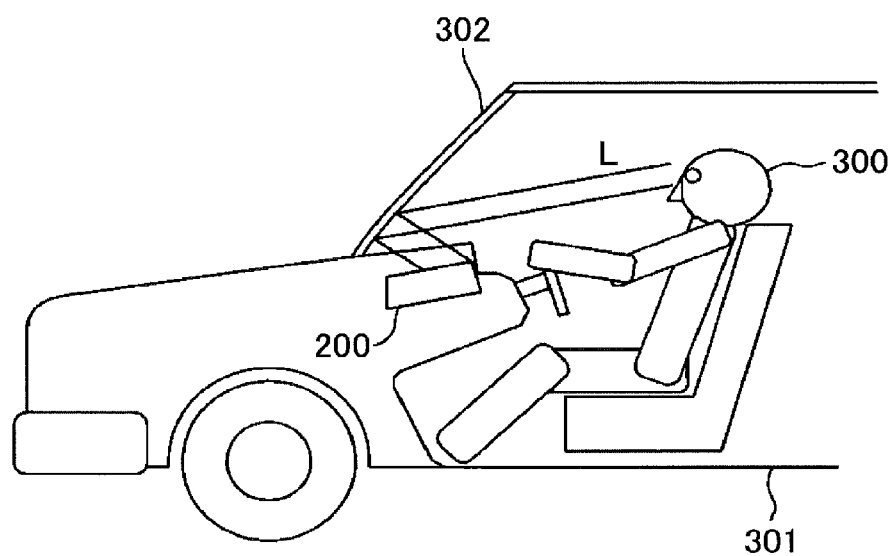
FIG. 2 is a schematic diagram schematically illustrating a configuration of an automobile equipped with an automotive HUD device, according to an embodiment.

FIG. 2 is a schematic diagram schematically illustrating a configuration of an automobile equipped with an automotive HUD device, according to an embodiment.

Figure 3:
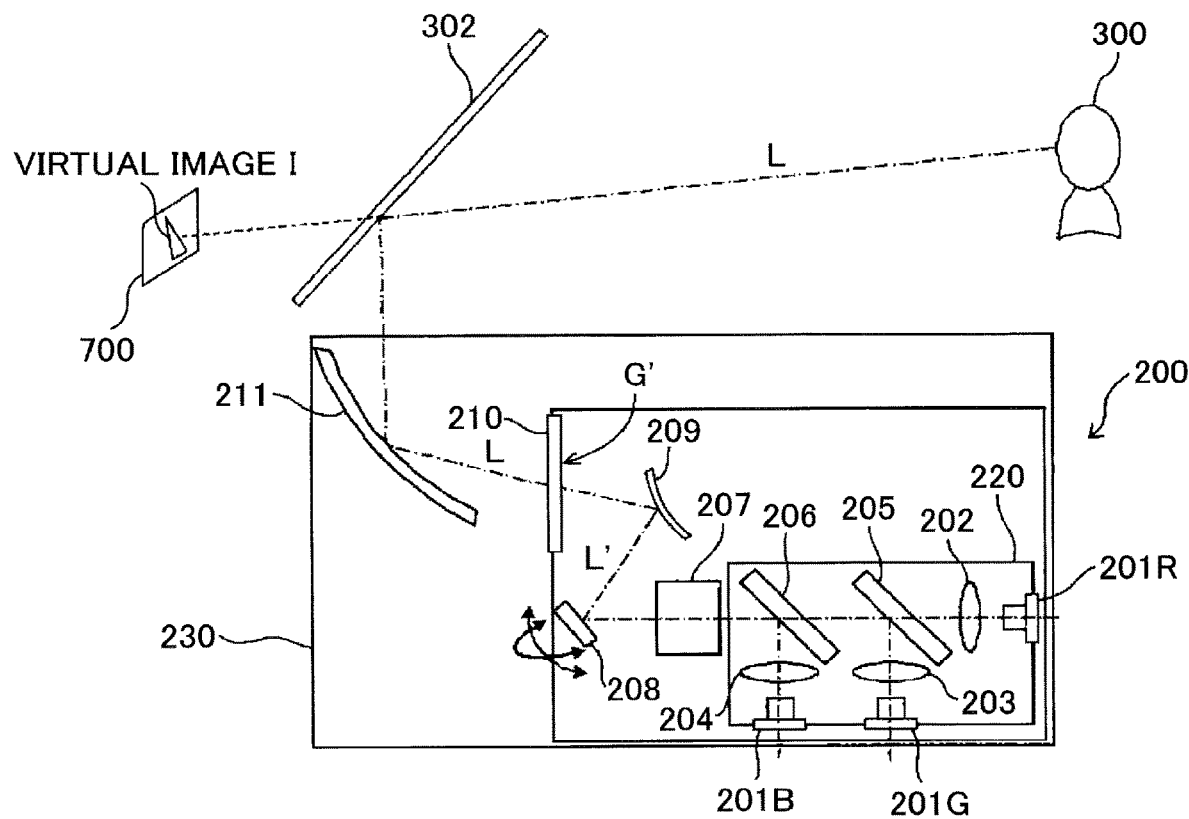
FIG. 3 is a schematic diagram schematically illustrating an internal configuration of the automotive HUD device, according to an embodiment.

FIG. 3 is a schematic diagram schematically illustrating an internal configuration of an automotive HUD device, according to an embodiment.

The automotive HUD device 200 according to a present embodiment is installed in a dashboard of the reference vehicle 301 (e.g., a traveling body as a moving body). Projected light L, which is image light emitted from the automotive HUD device 200 within the dashboard, is reflected by the windshield 302 (e.g., a transflective member) and the reflected image light travels toward the driver 300. As a result, the driver 300 may visually perceive a HUD display image such as a later-described navigation image as a virtual image I. Note that a combiner acting as a transflective member may be provided on an inner wall surface of the windshield 302, and the virtual image I may be visually perceived by a driver through the projected light L reflected by the combiner.

Note that the driver 300 visually perceives the virtual image I from an eye box (an area around the eyes of the driver 300) on an optical path of light reflected by the windshield 302. Note that the eye box means a range in which the virtual image I may be visually perceived without adjusting a position of the driver's viewpoint. The eye box serves as a reference point when converting the later-described "upper limit of the changing rate of the display position of the information providing image" into the angular change velocity.

In the present embodiment, an optical system or the like of the automotive HUD device 200 is configured such that a distance from the driver 300 to the virtual image I (a distance from the eye box to the virtual image I) is 4 m or more. In a conventional general automotive HUD device, the distance from the driver 300 to the virtual image I is approximately 2 m. In general, the driver 300 is gazing of a point of infinity ahead of the reference vehicle or gazing of a preceding vehicle several tens of meters ahead of the reference vehicle. When the driver 300 focusing on such a distance attempts to view the virtual image I presented 2 m ahead, the focal lengths greatly will differ, requiring substantial movement of the crystalline lens of the eyeball. Accordingly, a focus adjustment time for a driver to focus on the virtual image I increases, and a longer time may be required for the driver to perceive a content of the virtual image I, making the eyeball of the driver 300 susceptible to be fatigued. In addition, a driver is less likely to notice a content of the virtual image I, making it difficult to appropriately provide information to the driver via the virtual image I.

According to the present embodiment, in a case where the distance to the virtual image I is 4 m or more, the movement of the crystalline lens of the eyeballs will be largely reduced, compared to a case with the conventional automotive HUD device; hence, the focus adjustment time for a driver to focus on the virtual image I is shortened, enabling the driver 300 to visually perceive the content of the virtual image I quickly and to reduce fatigue of the eyeballs of the driver. Furthermore, according to the present embodiment, a driver will be more likely to notice the content of the virtual image I, making it easier to appropriately provide information to the driver through the virtual image I.

The automotive HUD device 200 includes, within the HUD body 230, red, green and blue laser light sources 201R, 201G and 201B, collimator lenses 202, 203 and 204 provided for the respective laser light sources 201R, 201G and 201B, two dichroic mirrors 205 and 206, a light quantity adjusting unit 207, an optical scanning device 208 as an optical scanner, a free-form surface mirror 209, a microlens array 210 as a light diverging member, and a projection mirror 211 as an optical reflection member. A light source unit 220 according to the present embodiment includes the laser light sources 201R, 201G and 201B, the collimator lenses 202, 203 and 204, and the dichroic mirrors 205 and 206 that are unitized by an optical housing.

As the laser light sources 201R, 201G and 201B, an LD (semiconductor laser element) may be used. The wavelength of a luminous flux emitted from the red laser light source 201R is, for example, 640 nm, the wavelength of a luminous flux emitted from the green laser light source 201G is, for example, 530 nm, and the wavelength of a luminous flux emitted from the blue laser light source 201B is, for example, 445 nm.

The automotive HUD device 200 according to the present embodiment projects an intermediate image formed, on a microlens array 210 onto the windshield 302 of the reference vehicle 301, allowing the driver 300 to visually perceive an enlarged image of the intermediate image as a virtual image I. The color laser beams emitted from the laser light sources 201R, 201G and 201B form substantially collimated light by the collimator lenses 202, 203 and 204, respectively, which are synthesized by the two dichroic mirrors 205 and 206. The light quantity of the synthesized laser beam is adjusted by the light quantity adjusting unit 207, and the synthesized laser beam is then two-dimensionally scanned by a mirror of the optical scanning device 208. Further, scan light L' two-dimensionally scanned by the optical scanning device 208 is reflected by the free-form surface mirror 209 and corrected for distortion, which is then focused on the microlens array 210 to render an intermediate image.

Note that in the present embodiment, the microlens array 210 is used as a light diverging member that individually diverges and emits the luminous flux for each pixel of the intermediate image (one point of the intermediate image); however, other light diverging members may be used in place of the microlens array 210. In addition, an intermediate image G' may be formed by using a liquid crystal display (LCD) or a fluorescent display tube (VFD).

Note that in order to display a large virtual image I with high luminance, the laser scanning method may be preferable as in this embodiment.

Furthermore, in the method using a liquid crystal display (LCD), a fluorescent display tube (VFD), or the like, slight light may also be emitted to a non-image portion within the display area, where the virtual image I is displayed; it may be difficult to completely block such light. Thus, viewability of a landscape in front of the reference vehicle 301 through the non-image portion may be poor. However, according to the laser scanning method as illustrated in this embodiment, with respect to the non-image portion within the display area of the virtual image I, light to be applied to the non-image portion will be completely blocked by turning off the laser light sources 201R, 201G and 201B. Thus, the viewability of a landscape in front of the reference vehicle 301 through the non-image portion may be prevented from lowering, which is caused by light emitted from the automotive HUD device 200, and to provide high viewability of the landscape (front landscape) in front of the reference vehicle.

Further, it is also preferable to use the laser scanning method in the case where display control is performed to partially increase luminance in a part of an image in the display area 700. In a system using a liquid crystal display (LCD), a fluorescent display tube (VFD), or the like, luminance also increases for other parts of the image displayed in the display area 700 other than the partially increased luminance part of the image displayed in the display area 700, which will result in no difference in luminance between the part or the image and the other parts of the image, within the display area 700.

The optical scanning device 208 tilts the mirror in a main scanning direction and a sub scanning direction by a known actuator driving system such as MEMS (Micro Electro Mechanical Systems) and performs two-dimensional scanning (raster scanning) of the laser light incident on the mirror. Drive control of the mirror is performed in synchronization with light emission timing of the laser light sources 201R, 201G and 201B. The optical scanning device 208 is not limited to the configuration according to the present embodiment, but may be configured by a mirror system having two mirrors that rotate around or oscillate from two mutually orthogonal axes, for example.

Figure 4:
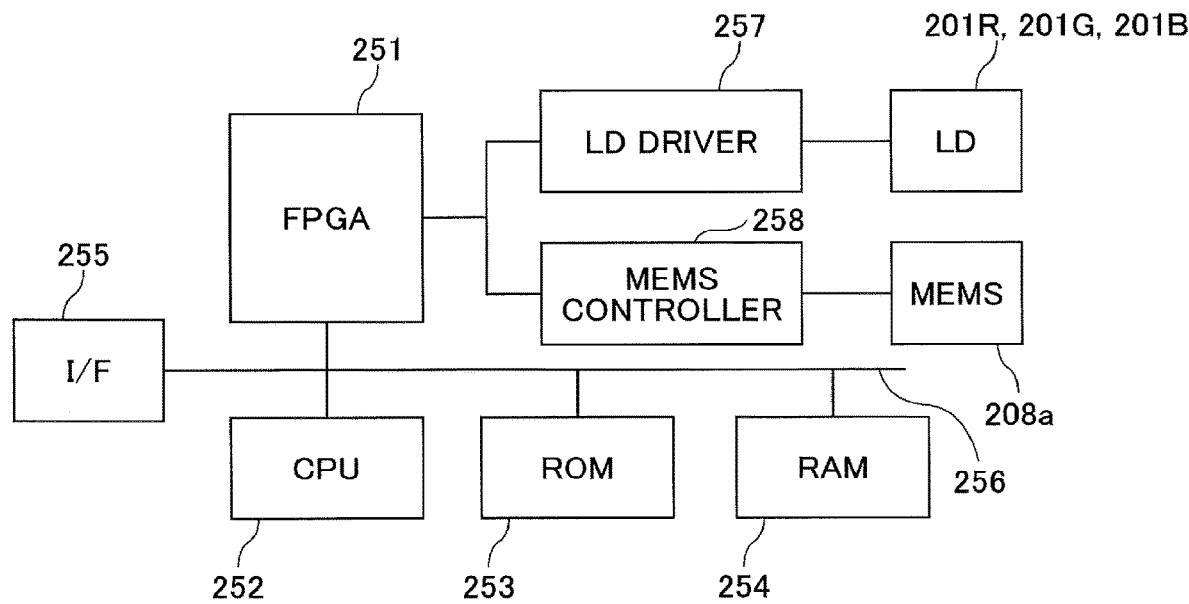
FIG. 4 is a hardware block diagram of a control system in the automotive HUD device, according to an embodiment.

FIG. 4 is a hardware block diagram of a control system in the automotive HUD device 200, according to the present embodiment.

As illustrated in FIG. 2, the control system of the automotive HUD device 200 includes an FPGA 251, a central processing unit (CPU) 252, a read-only memory (ROM) 253, a random access memory (RAM) 254, an interface (I/F) 255, a bus line 256, a laser diode (LD) driver 257 and a MEMS controller 258. The FPGA 251 controls operations of the laser light sources 201R, 201G and 201B of the light source unit 220 by the LD driver 257, and controls an operation of a MEMS 208a of the optical scanning device 208 by the MEMS controller 258. The CPU 252 controls each function of the automotive HUD device 200. The ROM 253 stores an image processing program, which is executed by the CPU 252 for controlling each function of the automotive HUD device 200. The RAM 254 is used as a work area of the CPU 252. The I/F 255 is an interface for communicating with an external controller or the like, and is connected to, for example, a vehicle navigation device 400, a sensor device 500, and the like described later via a CAN (Controller Area Network) of the reference vehicle 301.

Figure 5:
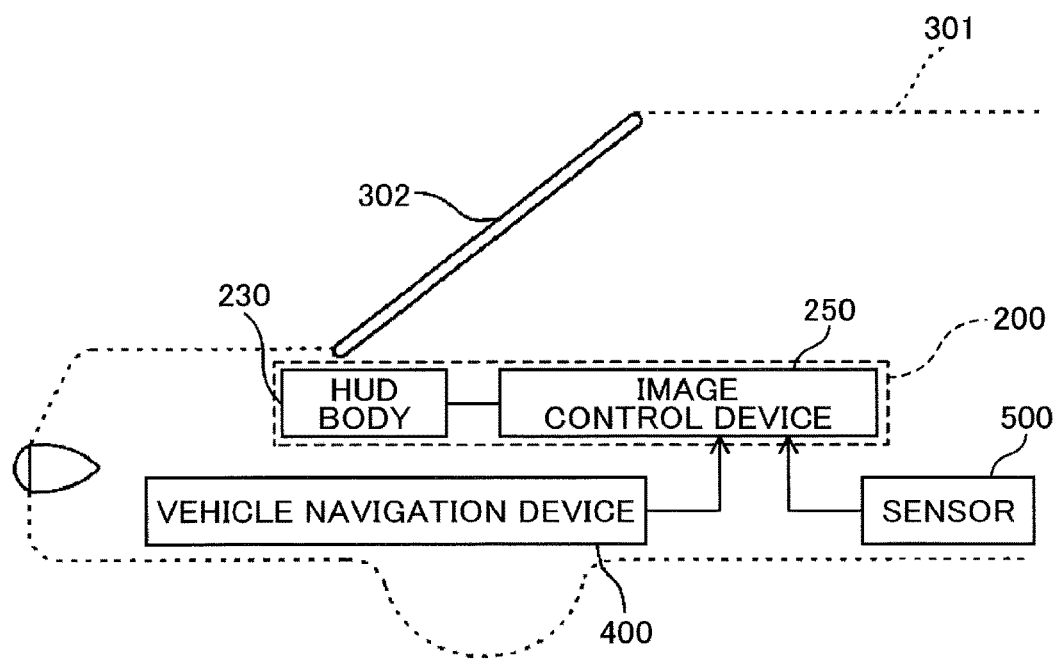
FIG. 5 is a block diagram illustrating a schematic configuration of a driver information providing system, according to an embodiment.

FIG. 5 is a block diagram illustrating a schematic configuration of a driver information providing system according to the present embodiment.

In the present embodiment, a vehicle navigation device 400, a sensor device 500, and the like are provided as an information acquisition unit configured to acquire driver-provided information provided to the driver through the virtual image I. The automotive HUD device 200 according to the present embodiment mainly includes a HUD main body 230 as an image light projection unit, and an image control device 250 as a display controller. The information acquisition unit in the present embodiment is mounted on the reference vehicle 301; however, the information acquisition unit may be installed outside the reference vehicle 301, and configured to input information acquired by the information acquisition unit via the communication unit.

The vehicle navigation device 400 according to the present embodiment may widely employ a known vehicle navigation device mounted on an automobile or the like. Information necessary for generating a route navigation image to be displayed as a virtual image I is output from the vehicle navigation device 400, which is then input to the image control device 250. The route navigation image may, for example, include an image indicating information such as a distance to a point where the reference vehicle 301 needs to change a route to destination (right turn, left turn, branching, etc.), a direction for the next change of the route, and the like. These pieces of information are input from the vehicle navigation device 400 to the image control device 250, which enables, under the control of the image control device 250, the automotive HUD device 200 to display navigation images such as route-specifying images 721-1 and 721-2 and a remaining distance-to-destination image 722 as a virtual image of information providing images in an upper area of the display area 700, as illustrated in FIG. 1.

The sensor device 500 according to the present embodiment includes one or more sensors for detecting various information indicating behaviors of the reference vehicle 301, the status of the reference vehicle 301, a situation around the reference vehicle 301, and the like. Sensing information necessary for generating an image to be displayed as a virtual image I is output from the sensor device 500, which is then input to the image control device 250. For example, vehicle velocity information included in the CAN information of the reference vehicle 301 is input from the sensor device 500 to the image control device 250, which enables, under the control of the image control device 250, the automotive HUD device 200 to display a vehicle velocity display image 704 indicating the vehicle velocity as a virtual image of information providing images in a lower area of the display area 700, as illustrated in FIG. 1.

Examples of a sensor of the sensor device 500, in addition to a sensor for detecting the vehicle velocity of the reference vehicle 301, include a laser radar device and an imaging device that detects a distance to other vehicles, pedestrians, buildings (guardrails, utility poles, etc.) existing around the reference vehicle 301 (front, side, rear), a sensor for detecting external environmental information (outside air temperatures, brightness, weather, etc.) of the reference vehicle, a sensor for detecting the driving operation (brake scanning, accelerator opening/closing degree, etc.) of the driver 300, a sensor for detecting the remaining amount of fuel in the fuel tank of the reference vehicle 301, a sensor for detecting conditions of various in-vehicle devices such as engines and batteries, and the like. Such information is detected by the sensor device 500 and is sent to the image control device 250 such that the information may be displayed by the automotive HUD device 200 as a virtual image I, which is provided to the driver 300.

Figure 6:
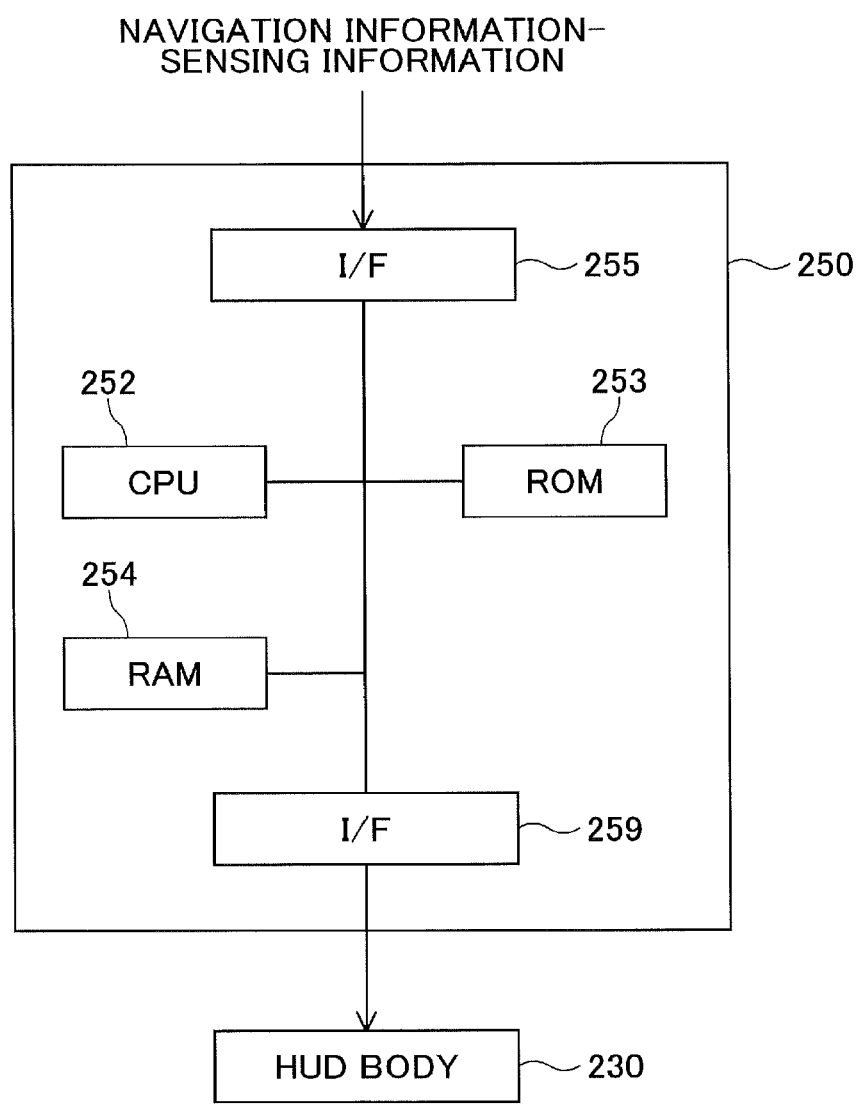
FIG. 6 is a hardware block diagram illustrating main hardware of an image control device in the automotive HUD device, according to an embodiment.

FIG. 6 is a hardware block diagram illustrating main hardware of the image control device 250.

In the image control device 250, the CPU 252, the RAM 254, the ROM 253, the input I/F 255, and the output I/F 259 are connected to one another by a data bus line. Sensing information output from the sensor device 500, navigation information output from the vehicle navigation device 400, and the like are input to the I/F 255. A control signal or the like of the HUD main body 230 is output from the I/F 259. The CPU 252 executes various computer programs such as an information providing control program stored in the ROM 253 or the like, and causes the image control device 250 to perform later-described various types of control and various processes.

Next, an illustration is given of display control of information providing images displayed as a virtual image I by the automotive HUD device 200.

In the automotive HUD device 200 according to the present embodiment, information provided to a driver through the virtual image I may be any information insofar as the information provided is useful information for a driver. Such information provided to a driver may be roughly divided into passive information and active information. The passive information is information to be provided to a driver at the timing set in the automotive HUD device 200. An example of passive information may include information having a certain relationship between the timing at which the information is provided and a content of the information. The active information is information provided to a driver simply at the timing desired by the driver. An example of the active information may include information having a low or no relationship between the timing at which the information is provided and the content of the information.

Specific examples of passive information include information related to safety during driving, route navigation information, and the like. Examples of information related to safety during driving include inter-vehicle distance information between the reference vehicle 301 and a preceding vehicle, and information with urgency relating to driving (e.g., warning information such as emergency operation instruction information for instructing a driver an emergency operation or attention calling information). Further, the route navigation information is information for guiding a driver a traveling route to a preset destination which is provided to a driver by a known vehicle navigation device. Examples of the route navigation information include traveling lane instructing information for instructing a driver to travel in a traveling lane at the nearest intersection and route changing operation instructing information for instructing a driver to perform a route change operation at the intersection or branch point at which the route should be changed from the straight traveling direction, or the like. Specifically, as the route change operation instruction information, routing information (route-specifying images 721-1 and 721-2) for designating a route to be taken at the intersection or the like, a remaining distance-to-destination information (a remaining distance-to-destination image 722) up to the intersection etc. at which the route change operation is performed, name information of the intersection, and the like may be given as examples.

The active information mainly includes information acquired by a driver at the timing desired by the driver, which thus continues to be displayed constantly or for a certain period of time. Examples of the active information include specific information of a road on which the reference vehicle 301 is traveling, the vehicle velocity information (vehicle velocity display image 704) of the reference vehicle 301, the current time information, and the like may be given. Examples of the specific information of the road (road-specific information) include road name information, restriction content information of the road such as the speed limit or no-passing, and information useful for a driver as information related to the road.

According to the present embodiment, the passive information and active information roughly classified as described above are displayed in corresponding display areas within the display area 700 in which a virtual image (information providing image) is displayed. More specifically, according to the present embodiment, the display area 700 is divided into two display areas in a vertical direction; a passive information image mainly corresponding to the passive information is displayed in the upper area of the display area 700, and an active information image mainly corresponding to the active information is displayed in the lower area of the display area 700.

In this case, the driver 300 who is driving normally watches at the point of infinity ahead of the reference vehicle or closely watches the back of the preceding vehicle that is traveling tens of meters ahead. The gazing point 710 may be approximately a vicinity of the center in the vertical direction of the front landscape from the windshield 302 or a vanishing point of the road surface. According to the present embodiment, the display area 700 is located so as to be superimposed on a lower part of a front landscape viewed from the windshield 302; more specifically, the display area 700 is located in an area where the driver 300 visually perceives a road surface via the windshield 302. Hence, according to the present embodiment, an upper side of the display area 700 is closer to the gazing point 710 of the driver.

Normally, an image displayed in the display area 700 is more likely to be visually perceived by a driver as the image displayed is closer to the gazing point 710 of the driver. Hence, it is preferable that an information providing image having a high priority for providing information to a driver (a high priority information providing image) is displayed at a position close to the gazing point 710 of the driver such that the driver 300 may quickly and clearly perceive such an information providing image. By contrast, it is preferable that an information providing image having a low priority (a low priority provision information image) is displayed at a position away from the gazing point 710 of the driver. This is because, for example, when a driver recognizes a high priority information providing image, the high priority information providing image is prevented from being interfered by a low priority information providing image, or the low priority information providing image is prevented from hindering the viewability of the driver to make the driver feel annoyed. According to the present embodiment, the information providing image with a high priority is displayed at a position closer to the driver's gazing point 710, that is, in the upper part of the display area 700, which is a position superior to the low-priority information providing image.

Further, in the present embodiment, two-dimensional display and three-dimensional display may be achieved. Human beings perceive depth in space on the basis of two dimensionally viewing in the field of view (pictorial cues), differences in view from two eyes or focusing action of the eyes (oculomotor cues), and changes in appearance of objects when viewpoint moves (motion parallax). Of these, human beings mainly use pictorial cues to perceive display information (information providing image) which is a virtual image as if it exists at any position in the real space.

In the real space, in a case where the same objects exist, the closer the object is to a viewer, the larger the apparent size becomes. Further, the closer the object is to the viewer, the lower the object appears in the part of the field of view. Besides, the farther the object is, the dimmer the object appears with thickness of the air.

In the information providing apparatus according to a present embodiment, an image projected on the windshield 302, which is superimposed on the front landscape is viewed by a viewer as a virtual image. Hence, it is possible to represent display information three dimensionally by adjusting (geometrically transforming) the geometric shape of the display information in the virtual image to match the real space. That is, the use of the depth perception of human beings as described above makes it possible for a viewer to perceive (an illusion of) the display information to exist three-dimensionally at any position in the real space as viewed from the viewer.

Hence, viewability of display information may be improved by representing display information that three-dimensionally matches a real object that exists in the vicinity of a reference vehicle as viewed from the viewer. Note that an image viewed as a virtual image that three-dimensionally matches a real object existing in the vicinity of the reference vehicle viewed from the viewer, may be displayed in combination with an image viewed as a virtual image that does not three-dimensionally match the real object, within a displayable area in the forward direction relative to front of the windshield 302.

In the following example, route-specifying images 721-1 and 721-2 indicating routing information and a remaining distance-to-destination image 722 are each information providing images that three-dimensionally match a real object. Such an information providing image is referred to as a superimposed information providing image. By contrast, the vehicle velocity display image 704 is a two-dimensional information providing image that does not three-dimensionally match a real object. Such an in formation providing image is referred to as a non-superimposed information providing image.

Figure 7A:
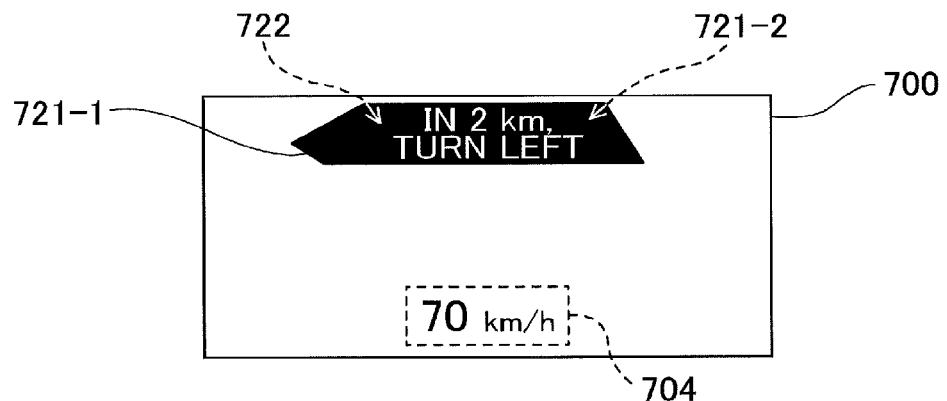
FIG. 7A is a diagram (part 1) illustrating an example of an image in which a display position of a vehicle velocity display image changes as a route-specifying image and a remaining distance-to-destination image move from an upper area to a lower area within a display area, according to an embodiment.
Figure 7B:
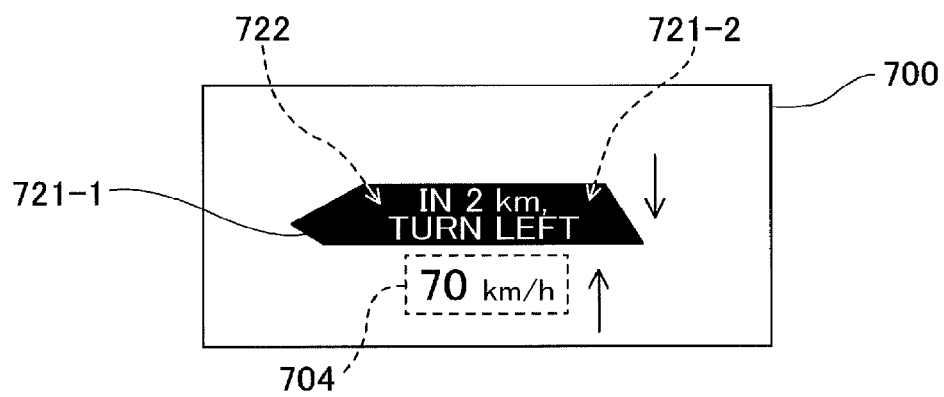
FIG. 7B is a diagram (part 2) illustrating an example of an image in which the display position of the vehicle velocity display image changes as the route-specifying image and the remaining distance-to-destination image move from an upper area to a lower area within a display area, according to an embodiment.
Figure 7C:
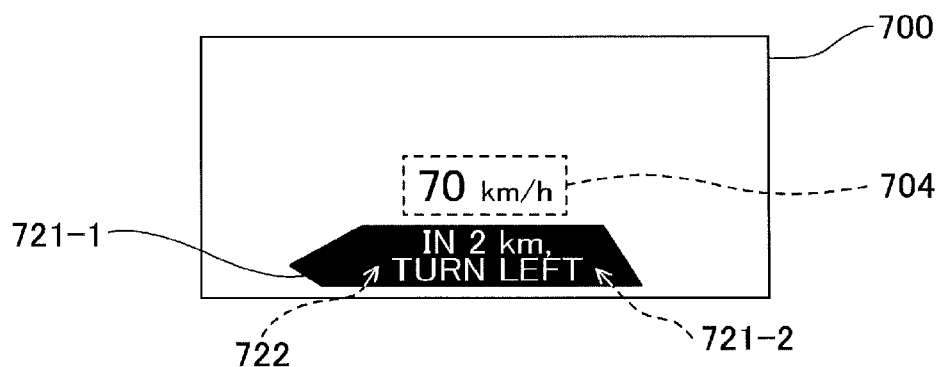
FIG. 7C is a diagram (part 3) illustrating an example of an image in which the display position of the vehicle velocity display image changes as the route-specifying image and the remaining distance-to-destination image move from an upper area to a lower area within a display area, according to an embodiment.

FIG. 7A to 7C are diagrams each illustrating an example of an image in which the display position of the vehicle velocity display image 704 changes in accordance with the moving of the route-specifying images 721-1 and 721-2 and the remaining distance-to-destination image 722, from the upper area to the lower area within the display area 700. The route-specifying images 721-1 and 721-2 indicate designation information for designating a route to destination that should be taken at the next intersection or the like.

The display positions of the route-specifying images 721-1 and 721-2 and the remaining distance-to-destination image 722 in the present embodiment are displayed so as to be superimposed on the road surface visually perceived by the driver 300 via the windshield 302, which is performed by the automotive HUD device 200 under the control of the image control device 250. More specifically, the route-specifying images 721-1 and 721-2 and the remaining distance-to-destination image 722 are displayed so as to be superimposed, via the windshield 302, at a point (a remaining distance-to-destination point) on the road surface, where a distance indicated by the route-specifying images 721-1 and 721-2 matches the distance indicated by the remaining distance-to-destination image 722. Note that the distance to an intersection or the like at which a route change operation is performed is indicated by the route-specifying images 721-1 and 721-2 and the remaining distance to the intersection or the like is indicated by the remaining distance-to-destination image 722.

In this case, the viewing position of the road surface visually perceived by the driver through the windshield 302 during driving moves from the upper side to the lower side within the display area 700 as the reference vehicle 301 travels. Therefore, the viewing position of the remaining distance-to-destination point on the road surface, on which the route-specifying images 721-1 and 721-2 and the remaining distance-to-destination image 722 are superimposed and displayed, also moves from the upper side to the lower side in the display area 700. According to the present embodiment, the image control device 250 performs display control such that the display positions of the route-specifying images 721-1 and 721-2 and the remaining distance-to-destination image 722 change from the upper side to the lower side in the display area 700, in accordance with the movement of the viewing position of the remaining distance-to-destination point on such a road surface.

More specifically, the image control device 250 calculates a viewing position at which the remaining distance-to-destination point is visually perceived by the driver within the display area 700, based on navigation information input from the vehicle navigation device 400, sensing information input from the sensor device 500, setting position information of the display area 700 of the virtual image I displayed by the automotive HUD device 200, the driver's viewpoint position information, and the like. Note that the viewpoint position information of the driver may be fixed information indicating the position of the head or the eyes of a standard driver. Alternatively, the actual position of the head or the eyes of a driver is detected by a detection device (imaging unit or the like) and information indicating the viewpoint position of the driver obtained based on the detection result may be used as the viewpoint position information of the driver.

When the viewing position of the remaining distance-to-destination point thus calculated enters the display area 700 along with traveling of the reference vehicle 301, the image control device 250 causes, as illustrated in FIG. 7A, the automotive HUD device 200 to display the route-specifying images 721-1 and 721-2 and the remaining distance-to-destination image 722 at a position superimposed on the viewing position of the remaining distance-to-destination point. There after, as the viewing position of the remaining distance-to-destination point moves downward within the display area 700 along with the traveling of the reference vehicle 301, the image control device 250 controls the automotive HUD device 200 such that the display positions of the route-specifying images 721-1 and 721-2 and the remaining distance-to-destination image 722 move downward as indicated by a downward arrow in FIG. 7B. As a result, while the viewing position of the remaining distance-to-destination point moves downward within the display area 700, the driver may visually perceive the route-specifying images 721-1 and 721-2 and the remaining distance-to-destination image 722 so as to be superimposed on the viewing position of the remaining distance-to-destination point.

Note that the viewing position of the remaining distance-to-destination point will move downward within the display area 700 as the vehicle 301 travels. Note that displays of the route-specifying images 721-1 and 721-2 and the remaining distance-to-destination image 722 may be made to disappear at the timing when the viewing position of the remaining distance-to-destination point moves downward within the display area 700. However, in this case, during the time when the viewing position of the remaining distance-to-destination point moves downward within the display area 700, the driver may fail to visually perceive the route-specifying images 721-1 and 721-2 and the remaining distance-to-destination image 722 superimposed on the viewing position of the remaining distance-to-destination point. In particular, when the vehicle velocity of the reference vehicle 301 is high, the time until the viewing position of the remaining distance-to-destination point moves downward within the display area 700 is short; thus, the driver will be more likely to fail to visually perceive the route-specifying images 721-1 and 721-2 and the remaining distance-to-destination image 722 superimposed on the viewing position of the remaining distance-to-destination point.

Therefore, according to the present embodiment, even after the viewing position of the remaining distance-to-destination point has moved downward within the display area 700, the image control device 250 performs display control such that the route-specifying images 721-1 and 721-2 and the remaining distance-to-destination image 722 are continuously displayed in the lower area of the display area 700, as illustrated in FIG. 7C. More specifically, the image control device 250 stops the changes of the display positions of the route-specifying images 721-1 and 721-2 and the remaining distance-to-destination image 722, which are changed in accordance with the movement of the viewing position of the remaining distance point, at the time when the display position reaches a final movement position illustrated in FIG. 7C. Accordingly, even ater the viewing position of the remaining distance-to-destination point has moved downward within the display area 700, the driver will still be able to visually perceive the route-specifying images 721-1 and 721-2 and the remaining distance-to-destination image 722 to acquire information of those information pieces.

However, as illustrated in FIG. 7A, the final movement position, to which the display positions of the route-specifying images 721-1 and 721-2 and the remaining distance-to-destination image 722 are located, is at a position at which the vehicle velocity display image 704 has been originally displayed. Therefore, if the vehicle velocity display image 704 is supposed to be continuously displayed as it is at the final movement position, the route-specifying images 721-1 and 721-2, the remaining distance-to-destination image 722 would be superimposed on the vehicle velocity display image 704, making it difficult for a driver to accurately acquire such information. Further, it may also be considered to hide the vehicle velocity display image 704 displayed at the final movement position when positioning the route-specifying images 721-1 and 721-2 and the remaining distance-to-destination image 722 to the final movement position. However, in this case, the driver no longer visually perceives the vehicle velocity display image 704, and the driver is thus unable to obtain the vehicle velocity.

Accordingly, according to the present embodiment, when the route-specifying images 721-1 and 721-2 and the remaining distance-to-destination image 722 are positioned at the final movement position, the display position of the vehicle velocity display image 704 displayed at the final movement position is changed such that the vehicle velocity display image 704 is displayed at another position. Specifically, the image control device 250 moves the display positions of the route-specifying images 721-1 and 721-2 and the remaining distance-to-destination image 722 to the final movement position illustrated in FIG. 7C, and also changes the display position of the vehicle velocity display image 704 displayed at the final movement position to a final change position illustrated in FIG. 7C (the display position of a set of the images 721-1, 721-2 and 722 is switched with the display position of the vehicle velocity display image 704). As a result, even after the route-specifying images 721-1 and 721-2 and the remaining distance-to-destination image 722 are positioned at the final moving position, the driver may be able to visually perceive the vehicle velocity display image 704 to acquire the vehicle velocity information.

In this case, as illustrated in FIGS. 7A to 7C, the display position of the vehicle velocity display image 704 changes upward within the display area 700. When the driver 300 notices this change, the consciousness (or attention) and visual line of the driver who is driving while visually perceiving the point of gaze in front of the vehicle are attracted to the vehicle velocity display image 704 to cause the driver to feel annoyed or to hinder safe driving. Accordingly, it is preferable to slowly change the display position of the vehicle velocity display image 704 that is a non-superimposed image so as not to be noticed by the driver. Note that the "non-superimposed image" means an image on which another image is not superimposed.

Specifically, the motion rate threshold is the limit at which an observer perceives a change of a display position of an image in a heterogeneous background from visual information; the motion rate threshold is 1 min/sec to 2 min/sec (=$\frac{1}{60}$ deg/sec to $\frac{2}{60}$ deg/sec) when converted to the time change per second of the viewing angle of an observer who views the display position of the image. Accordingly, when the changing rate of the display position of the vehicle velocity display image 704 is controlled to be, for example, 2 min/sec or less, the driver will not notice the change of the display position of the vehicle velocity display image 704.

However, when the changing rate of the display position of the vehicle velocity display image 704 is low, it will take time for the display position of the vehicle velocity display image 704 to reach the final change position illustrated in FIG. 7C. As a result, the display position of the vehicle velocity display image 704 will not be quickly changed to the final change position. This indicates that the display position of the vehicle velocity display image 704 will not be successfully changed to the final change position illustrated in FIG. 7C before the display positions of the route-specifying images 721-1 and 721-2 and the remaining distance-to-destination image 722 reach the final movement position illustrated in FIG. 7C.

Specifically, according to the present embodiment, the time until the display positions of the route-specifying images 721-1 and 721-2 and the remaining distance-to-destination image 722 reach the final movement position illustrated in FIG. 7C is shorter as the vehicle velocity of the reference vehicle becomes higher. Specifically, when the vehicle velocity of the reference vehicle is high, the display position of the vehicle velocity display image 704 will not be changed to the final change position illustrated in FIG. 7C before the display positions of the route-specifying images 721-1 and 721-2 and the remaining distance-to-destination image 722 reach the final movement position illustrated in FIG. 7C.

The motion rate threshold, at which an observer perceives a change of a display position of an image from the visual information, increases as the homogeneity of the background increases. The motion rate threshold for homogeneous background is a said to increase from 10 times to 20 times that for heterogeneous background case. That is, when the background is homogeneous, the motion rate threshold for images in the background will be approximately 10 min/sec to 40 min/sec (=10/60 to 40/60 deg/sec). Therefore, the change of the display position will not easily be perceived by the observer on account of the high homogeneity of the background even when the display position of an image is changed at a relatively fast changing rate (e.g., approximately 20 min/sec) at which the observer easily perceives the change of the display position of the image under a low homogeneity of the background.

According to the present embodiment, the driver 300 visually perceives the vehicle velocity display image 704, the display posit ion of which changes within the display area 700 in front of the vehicle, while visually perceiving a road surface as a traveling surface as a background, which is an object existing in front of the vehicle. In this case, the faster the vehicle velocity of the reference vehicle 301, the faster the moving rate of the viewing position of the road surface in front of the reference vehicle moves in the display area 700. That is, as the vehicle velocity of the reference vehicle 301 increases, the moving rate of the background of the vehicle velocity display image 704 in the display area 700 increases.

As the moving rate of a background of the vehicle velocity display image 704 within the display area 700 increases, the homogeneity visually perceived by the driver regarding the background becomes higher. To give specific examples, there are figures or patterns such as white lines 310 and crosswalks, symbols such as letters and signs indicating the speed limit etc. dotted over a uniform gray asphalt surface on the road surface existing in front of the vehicle. When the vehicle velocity of the reference vehicle is low, the moving rate of the viewing position of the symbol on the road surface visually recognized by the driver lowers. As a result, the symbol is easily distinguished from the asphalt surface so as to be visually perceived by the driver easily. Therefore, the road surface visually perceived by the driver, that is, the background of the vehicle velocity display image 704 has low homogeneity in which the asphalt surface and the symbol are clearly distinguished. By contrast, when the vehicle velocity of the reference vehicle is high, the moving rate of the viewing position of the symbol on the road surface visually recognized by the driver increases. As a result, the symbol is not easily distinguished from the asphalt surface and is not visually perceived by the driver easily. Therefore, the road surface visually perceived by the driver, that is, the background of the vehicle velocity display image 704 has high homogeneity in which the asphalt surface and the symbol are uniformly blended.

As the vehicle velocity of the reference vehicle 301 increases, the homogeneity of the background of the vehicle velocity display image 704 visually perceived by the driver 300 increases; hence, a change of the display position of the vehicle velocity display image 704 that is viewed as being superimposed on the background will be less likely to be perceived by the driver as the vehicle velocity increases. Accordingly, even when the changing rate of the display position of the vehicle velocity display image 704 is increased, that is, even when a changing rate exceeds the motion rate threshold for a heterogeneous background of 1 min/sec to 2 min/sec (e.g., approximately 20 min/sec), the high vehicle velocity will not allow the driver to easily perceive the change of the display position.

Therefore, in the present embodiment, the image control device 250 executes display control such that the changing rate of the display position of the vehicle velocity display image 704, which is a non-superimposed image, increases as the vehicle velocity of the reference vehicle 301 increases. More specifically, the image control device 250 displays the route-specifying images 721-1 and 721-2 and the remaining distance-to-destination image 722 in the upper area of the display area 700 and also acquires vehicle velocity information from the sensor device 500, at the timing when the viewing position of the remaining distance-to-destination point enters the display area 700, as illustrated in FIG. 7A. Note that the image control device 250 executes display control such that the changing rate of the display position of the vehicle velocity display image 704, which is a non-superimposed image, increases as the vehicle velocity of the reference vehicle 301 increases.

When the acquired vehicle velocity information is a low velocity (e.g., less than 60 km/h), the image control device 250 executes display control such that the display position of the vehicle velocity display image 704 changes at, for example, 10 min/sec. When the vehicle velocity information indicates a low velocity, the road surface visually perceived by the driver, that is, the background of the vehicle velocity display image 704 is relatively low in homogeneity. However, when the changing rate is 10 min/sec or less, a sufficient effect of not allowing a driver to visually perceive the change of the display position may be obtained.

By contrast, when the acquired vehicle velocity information is a high velocity (e.g., 60 km/h or more), the image control device 250 executes display control such that the display position of the vehicle velocity display image 704 changes at, for example, 15 min/sec. When the vehicle velocity information indicates a low velocity, and the changing rate of the display position of the vehicle velocity display image 704 is 15 min/sec, the driver will be likely to visually perceive the change of the display position easily. However, when the vehicle velocity information indicates a high velocity, the road surface visually perceived by a driver, that is, the background of the vehicle velocity display image 704 will be high in homogeneity. Thus, even when the changing rate is 15 min/sec, a sufficient effect of not allowing a driver to visually perceive the change of the display position may be obtained.

Furthermore, in the present embodiment, the direction in which the display position of the vehicle velocity display image 704, which is a non-superimposed image, changes is a vertical, direction of the display area 700; however, the direction in which the display position of the vehicle velocity display image 704 changes may, for example, be a horizontal direction of the display area 700. However, when the direction in which the display position of the vehicle velocity display image 704 changes is the horizontal direction of the display area 700, the changing rate of the display position of the vehicle velocity display image 704 is made lower than that in the present embodiment, irrespective of the vehicle velocity information being a low velocity or high velocity.

That is, in the case of the present embodiment, the direction in which the display position of the vehicle velocity display image 704 changes (i.e., the vertical direction of the display area 700) is a direction along a movement direction in which the viewing position of the road surface in front of the vehicle moves within the display area 700. While the driver of the vehicle 301 is viewing a scene in the front of the reference vehicle during driving the reference vehicle, the driver continuously views the viewing position of the road surface in front of the reference vehicle regularly moving from top to bottom in the display area 700. Therefore, the movement complied with this regularity (movement of moving in the vertical direction within the display area 700) is generally harder to be perceived by the driver than the movement against this regularity (movement of moving in the horizontal direction within the display area 700). Hence, according to this embodiment, when the direction in which the display position of the vehicle velocity display image 704 changes is the direction along the movement direction in which the visual recognition position of the road surface in front of the reference vehicle moves within the display area 700, a sufficient effect of not allowing a driver to visually perceive the change of the display position may be obtained, despite the changing rate of the display position of the vehicle velocity display image 704 being increased.

Modification 1

Next, a modification of display control in the present embodiment (hereinafter, this modification will be referred to as "modification 1") will be described.

In the above-described embodiment, the route-specifying images 721-1 and 721-2 and the remaining distance-to-destination image 722 displayed at the display position of the vehicle velocity display image 704 before the change are operation instruction information for giving an instruction for making a left turn at an intersection or the like 2 km ahead, as illustrated in FIGS. 7A to 7C. The information indicated by the route-specifying images 721-1 and 721-2 and the remaining distance-to-destination mage 722 is used for indicating an operation content to be operated at a substantially later timing. Hence, when compared with the vehicle velocity information indicated by the vehicle velocity display image 704, the priority of providing information to the driver is relatively low. Accordingly, in the embodiment described above, as illustrated in FIG. 7C, when the change of the display position of the vehicle velocity display image 704 is completed, the display position of the vehicle velocity display image 704 is changed upward within the display area 700. More specifically, the high priority vehicle velocity display image 704 is displayed on the upper side of the display area 700, that is, at the position closer to a driver's gazing point 710 than the position of the low priority route-specifying images 721-1 and 721-2 and remaining distance-to-destination image 722.

Figure 8A:
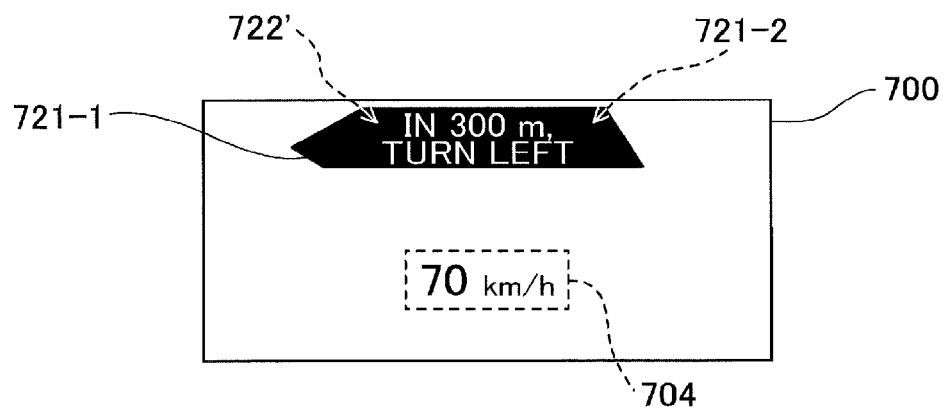
FIG. 8A is a diagram (part 1) illustrating an example of an image in which a display position of a vehicle velocity display image changes as a route-specifying image and a remaining distance-to-destination image move from an upper area to a lower area within the display area, according to a modification 1.
Figure 8B:
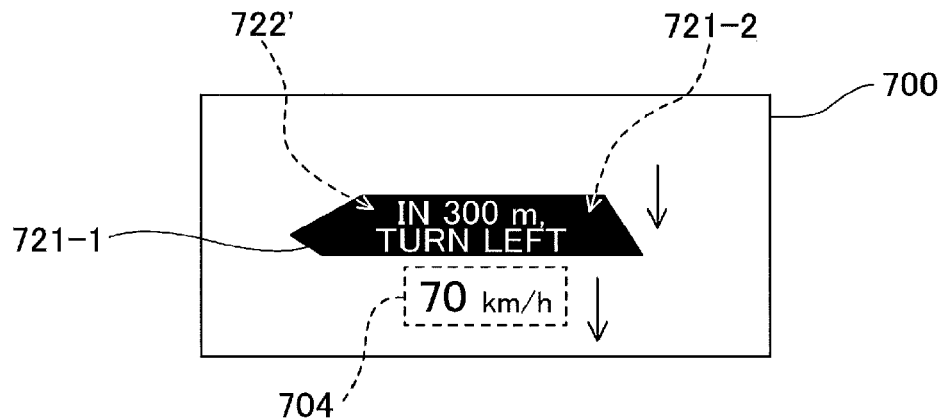
FIG. 8B is a diagram (part 2) illustrating an example of an image in which the display position of the vehicle velocity display image changes as the route-specifying image and the remaining distance-to-destination image move from an upper area to a lower area within the display area, according to the modification 1.
Figure 8C:
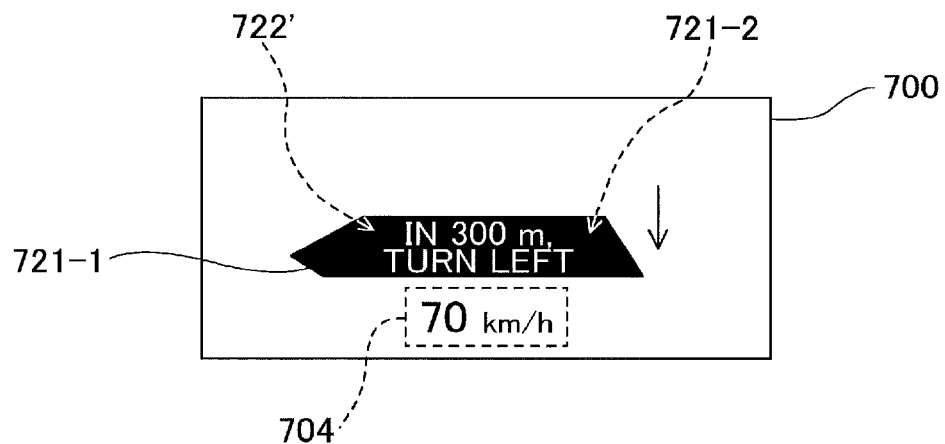
FIG. 8C is a diagram (part 3) illustrating an example of an image in which the display position of the vehicle velocity display image changes as the route-specifying image and the remaining distance-to-destination image move from an upper area to a lower area within the display area, according to the modification 1.

FIGS. 8A to 8C are diagrams each illustrating an example of an image in which a display position of the vehicle velocity display image 704 changes as the route-specifying images 721-1 and 721-2 and a remaining distance-to-destination image 722' move from an upper area to a lower area within the display area 700, according to the modification 1.

In the modification 1, the route-specifying images 722-1 and 721-2, and the remaining distance-to-destination image 722' to be displayed at the display position of the vehicle velocity display image 704 before the change are operation instruction information for giving an instruction for making a left turn at an intersection or the like 300 m ahead, as illustrated in FIGS. 8A to 8C. The information indicated by the route-specifying images 721-1 and 721-2 and the remaining distance-to-destination image 722 is used for indicating an operation content to be operated at a substantially close timing. Hence, when compared with the vehicle velocity information indicated by the vehicle velocity display image 704, the priority of providing information to the driver is relatively high.

Accordingly, in the modification 1, as illustrated in FIG. 8C, when the change of the display position of the vehicle velocity display image 704 is completed, the display position of the route-specifying images 721-1 and 721-2 and remaining distance-to-destination image 722' is changed upward within the display area 700. More specifically, the high priority route-specifying images 721-1 and 721-2 and remaining distance-to-destination image 722' are displayed on the upper side of the display area 700, that is, the position closer to a driver's gazing point 710 than the position of the low priority vehicle velocity display image 704. That is, the image control device 250 moves the display positions of the route-specifying images 721-1 and 721-2 and the remaining distance-to-destination image 722' to a final movement position illustrated in FIG. 8C, and also changes the display position of the vehicle velocity display image 704 displayed at the final movement position to a final change position illustrated in FIG. 8C.

Modification 2

Next, another modification of display control in the present embodiment (hereinafter, this modification will be referred to as "modification 2") will be described.

Figure 9A:
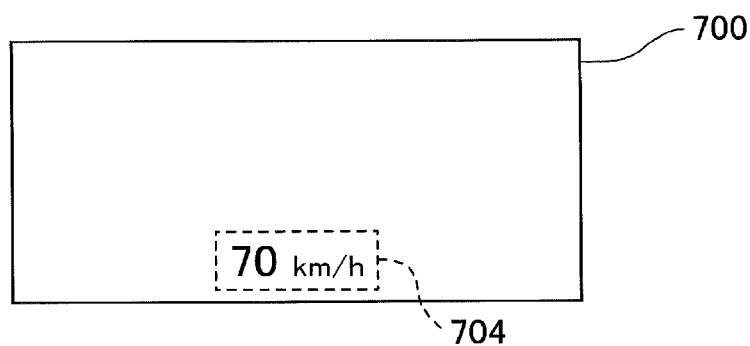
FIG. 9A is a diagram (part 1) illustrating an example of an image in which the display position of the vehicle velocity display image changes, according to a modification 2.
Figure 9B:
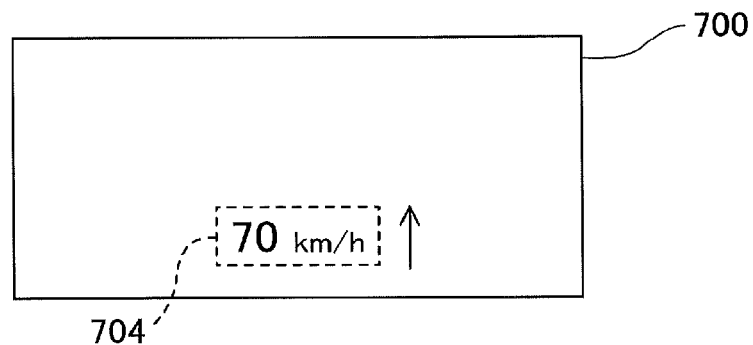
FIG. 9B is a diagram (part 2) illustrating an example of an image in which the display position of the vehicle velocity display image changes, according to the modification 2.
Figure 9C:
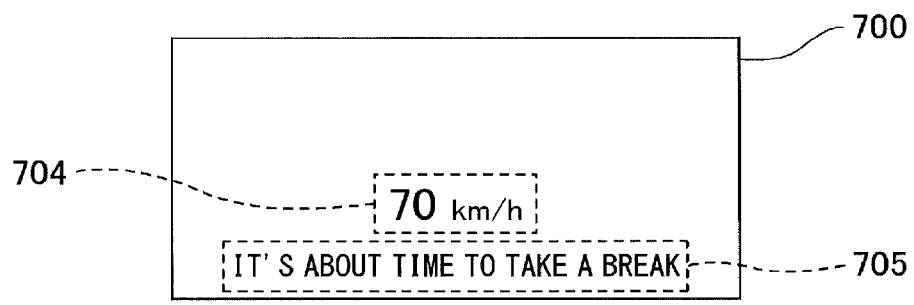
FIG. 9C is a diagram (part 3) illustrating an example of an image in which the display position of the vehicle velocity display image changes, according to the modification 2.

FIGS. 9A to 9C are diagrams each illustrating an example of an image in which the display position of the vehicle velocity display image 704 changes, according to the modification 2.

According to the above-described embodiment and the modification 1, as the route-specifying images 721-1 and 721-2 and the remaining distance-to-destination images 722 and 722' displayed in the upper area of the display area 700 are moved to the final movement position, the display position of the vehicle velocity display image 704 displayed at the final movement position is changed. By contrast, according to the modification 2, as illustrated in FIGS. 9A to 9C, after the display position of the vehicle velocity display image 704 is changed, another information providing image 705 (a character image "IT'S ABOUT TIME TO TAKE A BREAK" in FIG. 9C) is displayed at the display position (pre-change display position) of the vehicle velocity display image 704 before a start of being changed (before the display position of the vehicle velocity display image 704 starts being changed).

That is, as illustrated in the modification 2, another information providing image, which is displayed at the display position of the vehicle velocity display image 704 before the start of being changed, does not move from another position as in the embodiment described above, and may appear at the initial display position of the vehicle velocity display image 704 (before the start of being changed).

Furthermore, the present invention is not limited to the example in which another information providing image is displayed at the display position of the vehicle velocity display image 704 before the start of being changed as illustrated in the embodiment and modifications 1 and 2. The present invention may include an example in which the display position of the vehicle velocity display image 704 is simply changed (an example in which only the display position of the vehicle velocity display image 704 changes).

In the above-described embodiment (including modifications), an information providing image is superimposed on the landscape in front of the vehicle which the driver directly views via the windshield 302 by using an automotive head-up display (HUD) device. However, the present invention is not limited to such examples. For example, a real-time image obtained by imaging a landscape in front of the vehicle with an imaging unit is displayed on a display panel provided in place of the windshield 302, and the information providing image may be displayed in a predetermined display area within the display panel so as to be superimposed on the real time image (landscape image ahead of the vehicle).

Further, according to the above-described embodiment (including the modifications), an illustration is given of cases where information is provided to a driver of a moving body; however, the above-described embodiment (including the modifications) may be applied to cases where information is provided to an occupant who is a non-driver of a moving body (an occupant seated on an occupant seat of a vehicle, an occupant seated on a rear seat, etc.).

Further, in the above-described embodiment (including the modifications), a description is given of a case where the information providing image is displayed in the predetermined display area 700 set in the traveling direction of the moving body. However, the predetermined display area may be set on the side (door window, etc.) of the moving body, downward, upward (sun roof and the like), rearward (rear window etc.), and the like to display the information providing image.

The above illustrations are merely examples, and specific effects may be provided for each of the following modes.
(Aspect A)

According to an aspect A, an information providing apparatus (e.g., an automotive HUD device 200) includes a display unit (such as a HUD body 230) con figured to display information providing images (e.g., route-specifying images 721-1 and 721-2, a remaining distance-to-destination image 722, a vehicle velocity display image 704) in a predetermined display area 700 in which an object such as a road surface around a moving body is visually perceived by an occupant such as a driver 300 of the moving body (e.g., a reference vehicle 301); and a display controller (e.g., an image control device 250) configured to execute display control to control the display unit such that a display position of at least one information providing image (e.g., a vehicle velocity display image 704) changes in the predetermined display area in such an information providing apparatus, the display controller executes the display control such that the faster the traveling velocity (vehicle velocity) of the moving body, the faster the changing rate of the display position of the at least one information providing image.

Generally, the higher the homogeneity (or uniformity) of the background, the change of the display position of an image displayed so as to be superimposed on the background is less likely to be perceived by observers, and conversely, the lower the homogeneity of the background, such a change of the display position is more likely to be perceived by observers. Therefore, even for a relatively high changing rate of the display position of the image, such that an observer easily perceives the change of the display position when the background has low homogeneity, the observer is less likely to visually perceive the change of the display position with a background having high homogeneity.

According to this aspect, an occupant of the moving body visually perceives the information providing image displayed in the predetermined display area while directly or indirectly viewing objects existing around the moving body as the background. As an indirectly visually perceived aspect in this case, for example, an image of objects surrounding a moving body captured by an imaging unit is displayed together with the information providing image in a predetermined display area. The faster the moving velocity of the moving body (hereinafter referred to as "moving body velocity"), the higher the moving rate at which the viewing position of the objects around the moving body moves within the predetermined display area. That is, as the moving body velocity increases, the moving rate of the background of the information providing image in the predetermined display area increases.

As the moving rate of the background in the predetermined display area increases, the homogeneity with respect to the background visually perceived by the driver becomes higher.

For example, a road surface existing around a moving body may generally be a uniform gray asphalt surface, on which figures and patterns such as white lines, symbols, characters, and the like are dotted. Hence, when the moving body velocity is low, the moving rate of the viewing position of a symbol on the road surface is low such that the symbols and the like will be easily distinguished from the asphalt surface and visually perceived by the occupant. As a result, the road surface visually perceived by an occupant directly or indirectly, that is, the background of the information providing image has a low homogeneity in which the asphalt surface and the symbol are clearly distinguished. By contrast, when the moving body velocity is high, the moving rate of the viewing position of the symbols and the like on the road surface is high such that the symbols and the like will not be easily distinguished from the asphalt surface and visually perceived by the occupant. As a result, the road surface visually perceived by an occupant directly or indirectly, that is, the background of the information providing image has a high homogeneity in which the asphalt surface and the symbol are uniformly blended.

As the moving body velocity increases, the homogeneity of the background visually perceived by the occupant of the moving body increases; hence, the change of the display position of the information providing image that is viewed as being superimposed on the background will be less likely to be perceived by the occupant as the moving body velocity increases. Accordingly, upon the moving body velocity being high, the increased changing rate of the display position of the information providing image will not cause the occupant to perceive the change of the display position.

According to this aspect, the faster the moving body velocity, the faster the changing rate of the display position of the information providing image. Accordingly, upon the moving body velocity being low, the changing rate of the display position is sufficiently delayed such that the change of the display position of the information providing image will not be noticed to occupants. Upon the moving body velocity being high, the changing rate of the display position is increase d in a range to the extent in which the change of the display position of the information providing image will not be noticed by occupants. Accordingly, it is possible to shorten the time required to achieve a given purpose of changing the display position.

(Aspect B)

In the aspect A, the display controller executes display control such that the display position of the at least one information providing image displayed on a moving path of the viewing position changes along a direction, such as a vertical direction, in which a viewing position of an object such as a road surface or the like around the moving body moves within the predetermined display area as the moving body moves.

The occupant of the moving body continuously views a state where the viewing position of an object existing around the moving body moves regularly in the display area 700 during viewing of an outside of the moving body while the moving body is moving. It is more difficult for an occupant to perceive a change of the display position of the at least one information providing image that is consistent with the regularity of the movement of an object around the moving body as the background, as compared with the change of the display position that is not consistent with the regularity of the movement of the object around the moving body. According to this aspect, the change of the display position of the at least one information providing image is consistent with the regularity of the movement of an object around the moving body which is the background thereof. Hence, the increased changing rate of the display position of the at least one provided information image will not easily make the occupant perceive the change of the display position.

(Aspect C)

In the aspect A or B, the upper limit of the chancing rate, which is converted into the angular change velocity viewed from the view point of a viewer such as a driver 300 of the moving body, is 20 minutes per second.

Upon the changing rate of the display position of the at least one information providing image being made faster within a range of up to this upper limit, the change of the display position is less likely to be noticeable to the occupant of the moving body being moved.

(Aspect D)

In any one of the aspects A to C, the moving body moves on a traveling surface such as a road surface, and the predetermined display area 700 is configured so as to be superimposed at a position at which the traveling surface existing in a moving body traveling direction is visually perceived by an occupant of the moving body.

The traveling surface has relatively high homogeneity; hence, when a predetermined display area 700 is configured so as to be superimposed on a viewing position of such a traveling surface, a background with relatively high homogeneity may be easily obtained as a background of the information providing image displayed in the display area 700. Accordingly, the increased changing rate of the display position of the at least one information providing image will not easily cause the occupant to perceive the change of the display position.

(Aspect E)

In any one of the aspects A to D, the display controller executes the display control before displaying information providing images (route-specifying images 721-1 and 721-2 and remaining distance-to-destination images 722 and 722', etc.) differing from the at least one information providing image (vehicle velocity display image 704 etc.) at a display position (pre-change display position) of the at least one information providing image before a start of being changed.

According to the aspect E, when the display position of the at least one information providing image is changed from the display position (pre-change display position) before a start of being changed, in order for another information providing image to displayed at the display position (pre-change display position) of the at least one information providing image before the start of being changed, the change of the display position will not be likely to be noticed by an occupant.

(Aspect F)

In the aspect F, the display controller changes the display position of the other information providing image from a predetermined change start position (e.g., an upper area of the display area 700) to the pre-change display position (e.g., a lower area of the display area 700) of the at least one information providing image before the start of being changed, so as to display the other information providing image at the pre-change display position of the at least one information providing image before the start of being changed.

According to aspect F, when a display position of the at least one information providing image is changed from the pre-change display position of the at least one information providing image before the start of being changed, as the display position of the other information providing image is changed from the predetermined change start position to the pre-change display position of the at least one information providing image before the start of being changed, the change of the display position will not be likely to be noticed by an occupant.

(Aspect G)

In the aspect E or F, when the other information providing image has a lower priority for providing information to an occupant of the moving body than that of the at least one information providing image, the display controller executes the display control such that the display position of the at least one information providing image changes to a direction in which the display position of the at least one information providing image approaches a gazing point of the occupant.

According to aspect G, when another information providing image is displayed at the pre-change display position of the at least one information providing image before the start of being changed, the at least one information providing image with a higher priority is displayed at a position closer to a gazing point of the occupant than the other information providing image with a lower priority. As a result, the at least one information providing image with a higher priority is more easily viewed by the occupant than the other information providing image with a lower priority so as to promptly provide the information providing image with a higher priority to the occupant.

(Aspect H)

In any one of the aspects E to G, when the other information providing image has a higher priority for providing information to an occupant of the moving body than that of the at least one information providing image, the display controller executes the display control such that the display position of the at least one information providing image changes to a direction in which the display position of the at least one information providing image departs from the gazing point of the occupant.

According to aspect H, when another information providing image is displayed at the pre-change display position of the at least one information providing image before the start of being changed, the at least one information providing image with a lower priority is displayed at a position farther from the gazing point of the occupant than the other information providing image with a higher priority. As a result, the other information providing image with a higher priority is more easily viewed by the occupant than the at least one information providing image with a lower priority so as to promptly provide the information providing image with a higher priority to the occupant.

(Aspect I)

In any one of the embodiments A to H, an image light projection unit such as a HUD main body 230 or the like configured to project image light onto a transreflective member such as a windshield 302 is used as the display unit so as to display the information providing image in the predetermined display area 700, in which an object around the moving body is visually perceived by an occupant of the moving body via the transreflective member.

According to the aspect I, it is possible to achieve an information providing apparatus for displaying an information providing image via a HUD device.

(Aspect J)

In the aspect I, the image light projection unit is configured to display the information providing image as a virtual image I within the predetermined display area with projected image light, and a distance from the occupant to the virtual image I is 4 m or more.

As described above, an occupant of a moving body during moving frequently focuses on a distant point. When the distance from the occupant to the virtual image I is 4 m or more, the movement amount of the lens of the eyeball is reduced, as compared with a conventional general distance of 2 m. As a result, it is possible to shorten the focus adjustment time for adjusting a focal point to the virtual image I so as to visually perceive information provided by the information providing image with the virtual image I quickly, and also to reduce the fatigue of the occupant's eyeball.

(Aspect K)

In the above aspect I or J, the image light projection unit is configured to cause an optical scanner such as an optical scanning device 208 to two-dimensionally scan image light emitted from a light emitter such as a light source unit 220 and project the image light onto the transreflective member, so as to display the information providing image within the predetermined display area.

As described above, according to this aspect, a large virtual image I may easily be displayed with higher luminance, compared to a system using a liquid crystal display (LCD), a fluorescent display tube (VFD), or the like. Further, according to this aspect, it is possible to completely eliminate the light in a non-image portion by not allowing the light emitter to emit the image light corresponding to the non-image portion of the virtual image I. Therefore, it is possible to prevent the viewability of an object around the moving body through the non-image portion from being lowered by light emitted from the light emitter, to increase the viewability of the object around the moving body.

Advantageous Effect of the Invention

According to the disclosed technique, it is possible to provide an excellent effect of increasing a changing rate of the display position as high as possible within a range, in which occupants and the like of the moving body are less likely to notice the change of the display position of the information providing image.

Further, the present invention is not limited to these embodiments and examples described above, but various variations and modifications may be made without departing from the scope of the present invention.

What is claimed is:

1. An information providing apparatus installed in a moving body, the information providing apparatus comprising:
    one or more processors; and
    a memory, the memory storing instructions, which when executed by the one or more processors, cause the one or more processors to:
    display, by a display, an information providing image to be provided as a virtual image; and
    control the display so as to change a display position of the information providing image, wherein
    the information providing image includes two information providing images to be provided as a first information providing image and a second information providing image, and wherein to control the display, the instructions further cause the one or more processors to:
    control the display such that a changing rate of a display position of the first information providing image differs from a changing rate of a display position of the second information providing image based on a speed of the moving body that has been detected, and such that the changing rate of the display position of the first information providing image and the changing rate of the display position of the second information providing image both increase as a moving velocity of the moving body increases based on the speed of the moving body that has been detected.

2. The information providing apparatus according to claim 1, wherein to control the display, the instructions further cause the one or more processors to:
    control the display such that a lower changing rate from among the changing rate of the display position of the first information providing image and the changing rate of the display position of the second information providing image increases as a moving velocity of the moving body increases.

3. The information providing apparatus according to claim 2, wherein to control the display, the instructions further cause the one or more processors to:
    control the display so as to change the display position of the first information providing image in a first direction, and to change the display position of the second information providing image in a second direction differing from the first direction.

4. The information providing apparatus according to claim 3, wherein
    the first information providing image is a low priority information providing image having a low priority for providing information and the second information providing image is a high priority information providing image having a high priority for providing information, and wherein to control the display, the instructions further cause the one or more processors to:
    control the display such that the display position of the high priority information providing image is replaced with the display position of the low priority information providing image.

5. The information providing apparatus according to claim 4, wherein
the second direction is a direction approaching a gazing point of an occupant of the moving body.

6. The information providing apparatus according to claim 5, wherein
the first direction is a direction away from a gazing point of an occupant of the moving body.

7. The information providing apparatus according to claim 4, wherein to control the display, the instructions further cause the one or more processors to:
control the display such that the low priority information providing image is displayed at a pre-change display position of the high priority information providing image, the pre-change display position being the display position of the high priority information providing image before being changed.

8. The information providing apparatus according to claim 1, wherein
the information providing image is a non-superimposed image on which another image is not superimposed.

9. The information providing apparatus according to claim 1, wherein to control the display, the instructions further cause the one or more processors to:
control the display to change the display position of the information providing image so as to display another information providing image at a pre-change display position of the information providing image, the pre-change display position being the display position of the information providing image before being changed.

10. The information providing apparatus according to claim 1, wherein
an upper limit of the changing rate is 20 minutes per second converted into an angular change velocity with respect to a reference point within the moving body.

11. The information providing apparatus according to claim 1, wherein
the display uses an image light projector configured to project image light onto a transflective member so as to display the information providing image via the transflective member.

12. The information providing apparatus according to claim 11, wherein
a distance from a reference point within the moving body to the virtual image is 4 m or more.

13. The information providing apparatus according to claim 11, wherein
the image light projector causes an optical scanner to two-dimensionally scan image light emitted from a light emitter and projects the image light onto the transflective member so as to display the information providing image.

14. A moving body comprising:
the display according to claim 11, wherein
the transflective member is a windshield.

15. A computer implemented method, comprising:
displaying an information providing image to be provided as a virtual image;
controlling the displaying so as to change a display position of the information providing image, the information providing image includes two information providing images to be provided as a first information providing image and a second information providing image; and
controlling the displaying such that a changing rate of a display position of the first information providing image differs from a changing rate of a display position of the second information providing image based on a speed of the moving body that has been detected, and such that the changing rate of the display position of the first information providing image and the changing rate of the display position of the second information providing image both increase as a moving velocity of the moving body increases based on the speed of the moving body that has been detected.

16. The method according to claim 15, further comprising:
controlling the displaying such that a lower changing rate from among the changing rate of the display position of the first information providing image and the changing rate of the display position of the second information providing image increases as a moving velocity of the moving body increases.

17. The method according to claim 16, further comprising:
controlling the displaying so as to change the display position of the first information providing image in a first direction, and to change the display position of the second information providing image in a second direction differing from the first direction.

18. The method according to claim 17, wherein
the first information providing image is a low priority information providing image having a low priority for providing information and the second information providing image is a high priority information providing image having a high priority for providing information, and wherein to control the display, the method further comprising:
controlling the displaying such that the display position of the high priority information providing image is replaced with the display position of the low priority information providing image.

19. The method according to claim 18, wherein
the second direction is a direction approaching a gazing point of an occupant of the moving body.

20. The information providing apparatus according to claim 9, wherein
the first direction is a direction away from a gazing point of an occupant of the moving body.

* * * * *